United States Patent [19]

McClenan

[11] 4,213,664
[45] Jul. 22, 1980

[54] VISUALLY INSPECTABLE GROUNDING CONNECTOR FOR ELECTRICAL CABLE

[76] Inventor: Warren G. McClenan, 7009 Coldwater Canyon, #4, North Hollywood, Calif. 91605

[21] Appl. No.: 950,322

[22] Filed: Oct. 11, 1978

[51] Int. Cl.$^2$ .............................................. H01R 3/06
[52] U.S. Cl. .............................. 339/14 R; 339/94 R; 339/103 R
[58] Field of Search .................... 339/94 R, 94 A, 14, 339/103 R, 103 M

[56] References Cited
U.S. PATENT DOCUMENTS 3,739,076  6/1973  Schwartz ...................... 339/94 R X Primary Examiner—Roy Lake
Assistant Examiner—DeWalden W. Jones
Attorney, Agent, or Firm—Frederick E. Mueller

[57] ABSTRACT

An adapter shell and an intermediate shell internally contain an annular coil spring between an annular cam and a ring to effect radial contraction and compression of the spring into grounding contact with the braided layer of an electrical cable. Clearances are provided internally at one end of the intermediate member to define a line of sight to visually check the integrity of the grounding contact. A nut shell containing an annular seal closes the line of sight after the visual check has been made.

6 Claims, 5 Drawing Figures

VISUALLY INSPECTABLE GROUNDING CONNECTOR FOR ELECTRICAL CABLE

BACKGROUND OF THE INVENTION

The present invention relates to an improved terminating and grounding connector for electrical cables and the like. A great variety of cable terminating connectors have heretofore been devised, as exemplified, for example, by U.S. Pat. Nos. 3,739,076, 3,465,092, 3,501,737, 3,354,420, 3,108,292, 3,613,048, 3,154,632, 3,526,871, 3,057,951, 2,530,381, 2,306,821, Swedish Pat. No. 131,239 and Great Britain Pat. No. 1,374,529.

The present invention provides an improved electrical cable terminating and grounding connector, particularly in providing means for visual inspection of the integrity of the electrical grounding between the external conductor braid of the electrical cable and the connector shell. The invention also comprises other objects, advantages, and capabilities which will be apparent from the following description of a preferred embodiment of the invention. At the same time, it should be understood that the invention is susceptible of modification and change and embodiment in a variety of other specific forms without departing from the invention.

DESCRIPTION OF THE PREFERRED EMBODIMENT

Figure 1:
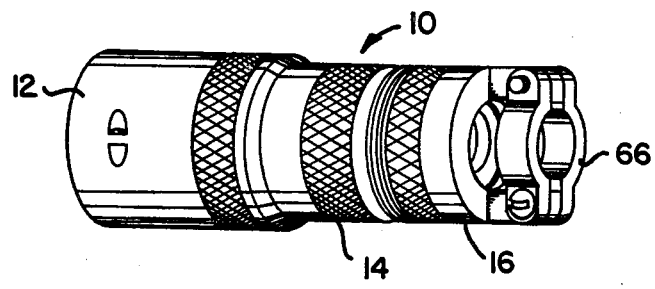
FIG. 1 is a perspective view of the connector of the invention in assembled condition in readiness for delivery to the ultimate user.
Figure 3:
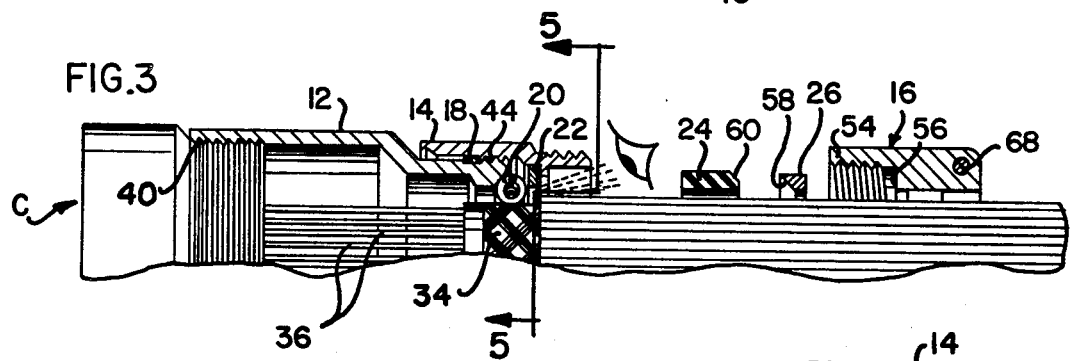
FIG. 3 is a partial axial sectional view illustrating an intermediate step in coupling the connector of the invention to a companion mating connector for terminating the cable end, and particularly illustrating the mode of visual inspection of the grounding connection.
Figure 5:
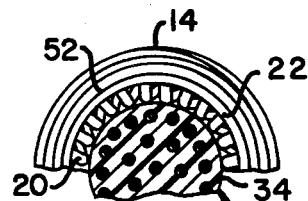
FIG. 5 is a partial transverse sectional view on the line 5—5 of FIG. 3.
Figure 4:
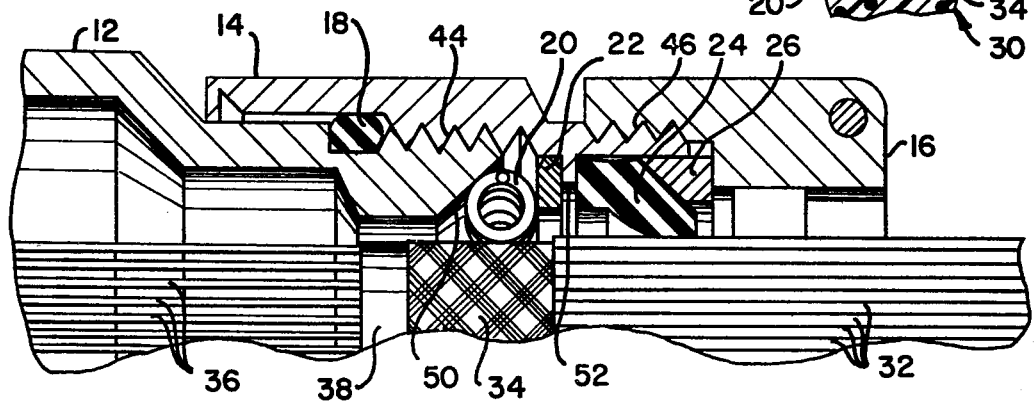
FIG. 4 is a partial axial sectional view, on a larger scale, showing the completed fully coupled relationship of the parts defining a grounded environmentally sealed cable connection.

An exemplary embodiment of the invention, sometimes called a "backshell", is shown in FIG. 1 and designated by the numeral 10. The exemplary connector 10 comprises a generally cylindrical adapter shell 12, an intermediate cylindrical shell 14, and an outer end strain relief nut assembly 16. The connector 10 also includes internal parts not visible in FIG. 1 which, as shown in FIG. 3, comprise an elastomeric O-ring seal 18, grounding spring 20, spring compression ring 22, elastomeric sealing gland 24, and gland compression ring 26.

Figure 2:
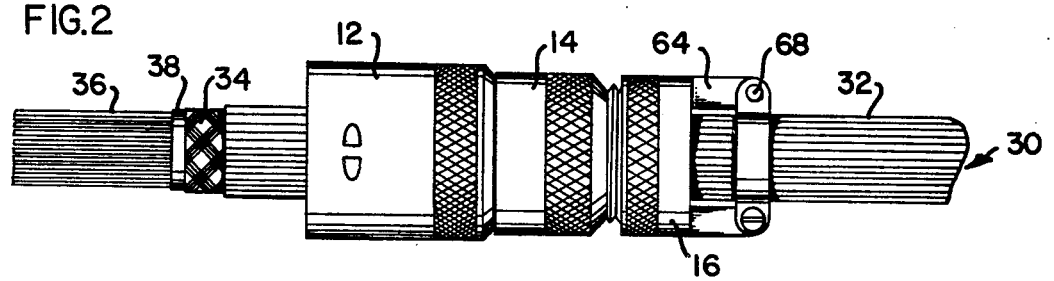
FIG. 2 is a side-elevational view of the assembled connector mounted on an end portion of a shielded electrical cable with the cable end shown as having been prepared for termination to a mating connector (not shown).

The parts of the exemplary connector 10 have a least diameter which is sufficiently large to freely pass over the terminating end of an exemplary electrical cable 30, as shown in FIG. 2. The cable end is illustrated as having been prepared for a connection to a companion connector C to which an inner end of the shell 12 is to be connected. Thus, the cable 30, conventionally and typically may have an outer jacket 32 surrounding a layer of conductive braid 34 which, in turn, surrounds a filled wire bundle of individual conductors 36. In the prepared cable end the wires 36 project beyond the braid 34 for a predetermined portion of their length, as is conventional, and a length of tape 38 has been circumferentially applied over the fringed ends of the braid 34.

More particularly, the cylindrical adapter shell 12 is internally threaded at one end (referred to for convenience as the inner end) as indicated at 40, for threaded connection to the companion connector C. At its other, outer end the shell 12 comprises a reduced diameter portion 42 that is externally threaded for threaded connection, as indicated at 44, to internal threads formed in the intermediate member 14. The intermediate member 14, in turn, is externally threaded at its outer end portion for threaded interconnection, as indicated at 46, to internal threads at the inner end portion of a nut shell 54 of the strain relief nut assembly 16.

The adapter shell 12, at its outer end facing the intermediate member 14, is internally formed with a frusto-conical surface 50 of about a 45° taper that defines a cam seat for the grounding annular coil spring 20. In an intermediate portion the intermediate member 14 is internally formed with a radially inwardly projecting annular flange 52 that on its inwardly facing side defines a shoulder for seating the annular spring compression ring 22. The inwardly facing side of the compression ring 22, in turn, abuts one side of the circular spring 20. The spring 20, in its relaxed state, preferably has a least diameter adapted for slidable contact with the jacket 32 of the cable on which it is to be mounted or defining a slight clearance relative thereof.

The strain relief nut assembly 16 includes an internally threaded nut shell 54 that is counterbored or step-drilled to define a shoulder 56 to seat one side of the gland compression ring 26. As shown, the ring 26 has an internal diameter adapted to pass slidably or with clearance over the cable 32 and on its inwardly facing side is formed with an annular inwardly divergent frusto-conical face 58. While the two parts are shown axially separated in FIG. 3, it should be understood that the ring 26 is normally seated on the shoulder 56 within the nut 54 and, in turn, seats the outwardly facing axial end of the compression gland 24. As shown, the sealing gland 24 is formed on the outwardly facing axial end with a frusto-conical outwardly divergent taper 60 adapted to seat the tapered surface 58 of the compression ring 26.

The strain relief nut shell 54 is externally formed on its outwardly facing end with a diametrically opposite pair of integral lugs 64, outer ends of which have an opposing pair of clamp members 66 connected thereto by fastener means 68.

In the use of the connector 10, it is first telescoped over the end of the cable 30 which is to be terminated to the companion mating connector C to assume the position shown in FIG. 2. Thereafter, the cable end is prepared to expose the desired length of the wires 36 and a predetermined length of the braid 34, the braid end being taped as indicated at 38.

Next, the conductor ends 36 are terminated or interconnected to the companion mating connector C after which the strain relief nut assembly 16 is unscrewed relative to the intermediate member 14 to be axially spaced relative thereto. It may, for example, be removed axially to the extent illustrated in FIG. 3. However, it will be understood that in FIG. 3 the sealing gland 24 and gland compression ring 26 will normally be retained within the nut shell 54 rather than axially spaced therefrom. The parts are shown separated in the drawing for purposes of clarity of illustration of the radial cross-section configurations of the several annular components of the connector 10.

The shell 12 is next threadedly advanced onto and secured onto the companion connector C. In this phase of assembly it will be understood that the shell 12 carries the intermediate member 14 along with it, so that the grounding spring 20 is moved into a position in overlying contact with or closely adjacent to the exposed length of braid 34. Next, the intermediate member 14 is threadedly advanced onto and tightly secured to the threaded outer end of the shell 12, as at 44. This tightening of the intermediate member 14 brings the ring 22 into forceful engagement with one side of the spring 20 which is thereby radially contracted by virtue of the cam surface 50 of the shell 12 so that an intimate tight grounding connection is achieved throughout essentially all coils of the circular spring 20 and the metal braid 34. At the same time, intimate grounding contact is achieved between essentially all of the coils of the circular spring 20 and the cam face 50, resulting in the desired grounding connection.

Next, the integrity of the grounding connection between the spring 20 and the braid 34 is determined in the manner indicated in FIG. 3. In this connection it will be observed that the inner diameters of the ring 20, internal flange 52 and outer end of the member 14, which are suitable shape characteristics to provide a visual inspection means such that the contact between the spring 20 and the braid 34 is observable throughout the circumference of the assembly.

If the grounding contact is satisfactory, the nut assembly 16 is next advanced towards and threadedly connected onto the outer threaded end of the intermediate member 14, as at 46. The compression gland 24 thus has its inwardly facing axial end seated in the shoulder defined by the outwardly facing side of the flange 52, while the bevelled inwardly facing side of the ring 26 effects radially inward compression and sealing contact of the outer end portion of the gland 24 with the surface of the cable jacket 32, effecting an hermetic seal. In this connection it will be observed that the tapered face 60 of the gland 24 cooperates with the tapered face 58 of the ring 26 to effect the desired radially inward sealing contraction into tight sealing engagement. Thus, an hermetic seal for the fully assembled connector 10 is achieved by the O-ring 18 and the gland 24.

As will now be apparent, the invention provides a connector for electrical cable which achieves a reliable ground connection whose integrity can be checked without the need for test equipment. As will be apparent, the invention may be embodied in any of the many species of connectors employed for terminating electrical cables.

I claim:

1. A visually inspectable grounding connector for electrical cable comprising:
    a coaxially connectable pair of cylindrical members of electrically conductive material internally supporting an annular electrically conductive grounding means of radially contractable structure;
    said pair of members internally containing means to radially contract said grounding means as a function of telescoping connecting movement of said pair of members;
    said pair of cylindrical members and said means to radially contract said grounding means together defining a least diameter affording an unobstructed line of sight from one end of one of said pair of members to the radially inner portion of said grounding means after said pair of members have been telescopically connected to fully radially contract said grounding means onto an electrical cable.

2. A grounding connector as in claim 1 in which said grounding means comprises a spring having helical coils.

3. A grounding connector as in claim 1 in which said means to radially contract said grounding means comprises internal shape characteristics of said pair of members and shape characteristics of said grounding means.

4. A grounding connector as in claim 1 in which said grounding means comprises an annular spring and said means to radially contract said grounding means comprises an annular cam surface on one of said pair of members in axially spaced apart relation to an annular surface within the other of said pair of members, said annular surface and said annular cam means being disposed on opposite sides of said annular spring.

5. A grounding connector as in claim 4 in which said annular surface comprises an annular ring carried on an internal shoulder of the other of said pair of members, said annular ring having an inner diameter that is less than the inner diameter of said spring by a predetermined radial distance.

6. In a grounding connector for electrical cable having a coaxially connectable pair of cylindrical members of electrically conductive material internally supporting an annular electrically conductive grounding means of radially contractable structure, with the pair of members internally containing means to radially contract the grounding means as a function of telescoping connecting movement of the pair of members, the improvement comprising:
    visual inspection means comprising internal shape characteristics of the pair of cylindrical members and of the means to radially contract the grounding means which together define a least diameter affording an unobstructed line of signt from one end of the pair of members to the radially inner portion of the grounding means after the pair of members have been telescopically connected to fully radially contract the grounding means onto an electrical cable.

* * * * *